United States Patent
Ollier et al.

(10) Patent No.: US 6,773,168 B2
(45) Date of Patent: Aug. 10, 2004

(54) STRUCTURE FOR SEPARATING AND PRE-POSITIONING AN ASSEMBLY OF FIBERS AND DEVICE DESIGNED TO RECEIVE AN ASSEMBLY OF FIBERS

(75) Inventors: Eric Ollier, Grenoble (FR); Hervé Poújard, Dolomieu (FR)

(73) Assignees: Commissariat a l'Energie Atomique, Paris (FR); Radiall, Rosny-Sous-Bois (FR)

(*) Notice: Subject to any disclaimer, the term of this patent is extended or adjusted under 35 U.S.C. 154(b) by 180 days.

(21) Appl. No.: 10/182,781

(22) PCT Filed: Dec. 4, 2001

(86) PCT No.: PCT/FR01/03822
§ 371 (c)(1),
(2), (4) Date: Aug. 1, 2002

(87) PCT Pub. No.: WO02/46798
PCT Pub. Date: Jun. 13, 2002

(65) Prior Publication Data
US 2003/0007741 A1 Jan. 9, 2003

(30) Foreign Application Priority Data
Dec. 5, 2000 (FR) .......................................... 00 15729

(51) Int. Cl.⁷ .............................................. G02B 6/36
(52) U.S. Cl. ............................. 385/76; 385/65; 385/83
(58) Field of Search ............................... 385/65, 76, 83

(56) References Cited
U.S. PATENT DOCUMENTS

| | | | |
|---|---|---|---|
| 4,305,642 A | * 12/1981 | Bloodworth et al. | ....... 385/134 |
| 4,629,284 A | * 12/1986 | Malavieille | ................... 385/70 |
| 5,377,289 A | * 12/1994 | Johnson et al. | ............... 385/65 |
| 5,400,426 A | 3/1995 | De Jong et al. | |
| 5,440,657 A | 8/1995 | Essert | |
| 5,471,555 A | * 11/1995 | Braga et al. | ................. 385/136 |
| 5,692,089 A | 11/1997 | Sellers | |
| 5,901,262 A | 5/1999 | Kobayashi et al. | |
| 6,553,173 B1 | * 4/2003 | Goto | .......................... 385/137 |

FOREIGN PATENT DOCUMENTS

| | | |
|---|---|---|
| DE | 197 11 283 | 10/1998 |
| FR | 2 756 056 | 5/1998 |
| WO | 00 26707 | 5/2000 |

* cited by examiner

*Primary Examiner*—Ellen E. Kim
(74) *Attorney, Agent, or Firm*—Oblon, Spivak, McClelland, Maier & Neustadt, P.C.

(57) ABSTRACT

A structure for separating and prepositioning a set of fibers, and a device designed to contain a set of separate fibers prepositioned using the structure. The separation and prepositioning structure includes at least one recess to contain and preposition a single fiber. The recess includes a bottom wall, a top wall, and at least one side wall formed by the side wall of a pattern with a front edge that is oblique with respect to the bottom wall of the recess. At least one inclined connection surface connects the oblique front edge to the rest of the side wall. The structure and device are applicable particularly to the alignment of optical fibers with microguides contained in an optical device.

18 Claims, 8 Drawing Sheets

STRUCTURE FOR SEPARATING AND PRE-POSITIONING AN ASSEMBLY OF FIBERS AND DEVICE DESIGNED TO RECEIVE AN ASSEMBLY OF FIBERS

DESCRIPTION

This invention relates to a structure for separating and prepositioning a set of fibers and a device designed to contain a set of separate fibers prepositioned using a structure according to the invention.

The invention is applicable to different domains including the connection of optical fibers to an optical device. The objective is then to put each optical fiber in line with a component, for example a microguide belonging to the optical device, as precisely as possible.

The problem that arises is the problem of alignment of the optical centerline of a fiber with the optical axis of the component. All types of manufacturing fluctuations (eccentricity of the core of fibers, variations on the outside diameter of fibers, dimensions of integrated optical devices, non-existence of precise mechanical marks) are all features that make the alignment difficult to achieve.

Some manufacturers of optical components deliver integrated components for which the connection to the fibers was already made in the factory. The component is then supplied with fiber pigtails that are fragile and consequently difficult to manipulate. The user must then take care not to damage them during all manipulation phases, and particularly during assembly of the component on an electronic card.

In the factory, the fibers are aligned with microguides either using mechanical precision marks, or by using "active" alignment methods by coupling that consist of injecting light into one of the microguides and aligning the fiber by maximizing the coupled light content. These alignment methods are expensive and take time to be implemented, and require dedicated high precision equipment.

Figure 1:
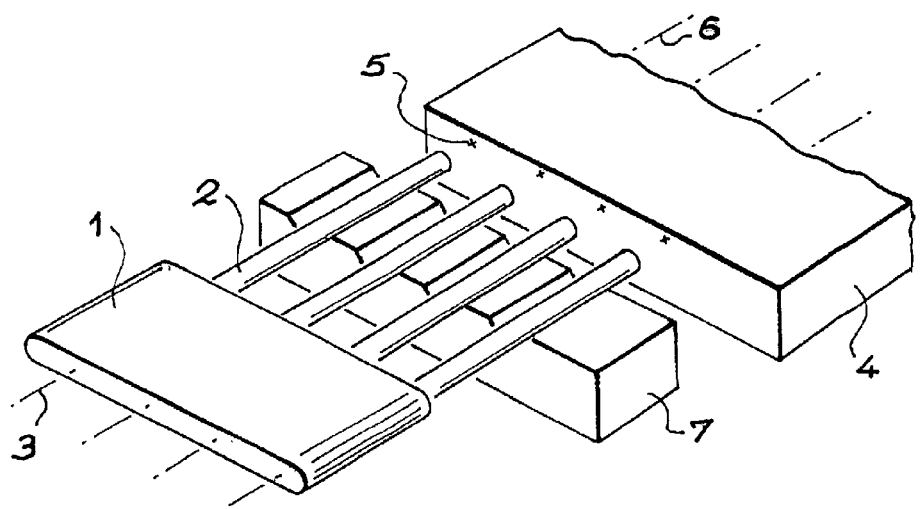

FIG. 1 shows a device for alignment by coupling of light. A ribbon 1 on which fibers 2 are fixed is placed facing an optical device 4. The optical centerline 6 of a microguide 5 is aligned with the optical centerline 3 of a fiber 2 using a light beam (not shown in the figure) to maximize optical transmission between the fiber and the microguide. Each optical fiber 2 is positioned in a notch formed in a support 7 that is then fixed to the optical device 4.

Figure 2:
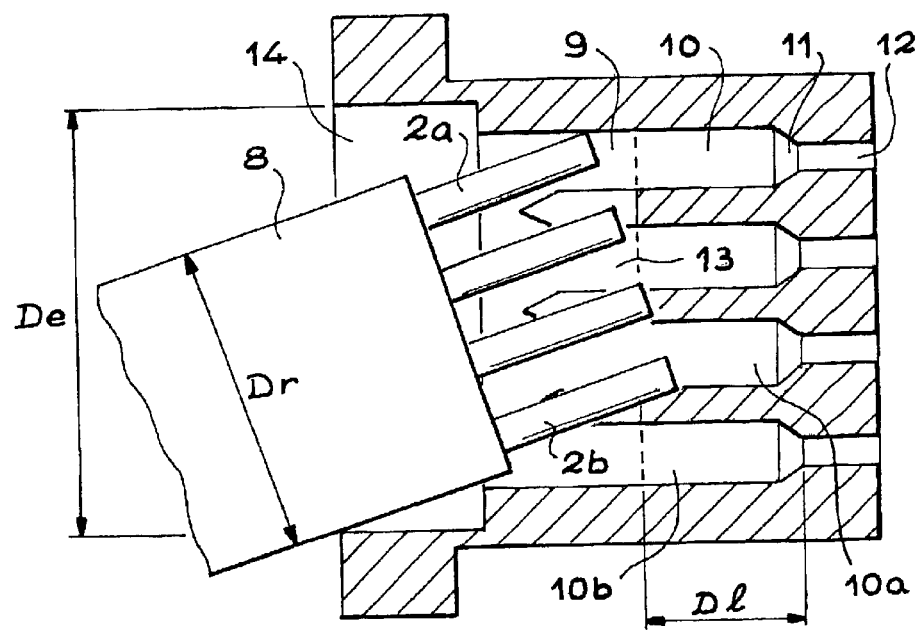

FIG. 2 shows a known alignment device using mechanical guidance. The device in FIG. 2 is commonly used for MT type rods. A ribbon 8 on which fibers are fixed is inserted by placing the fibers visually in the waves 9 with a circular or V-shaped bottom. The fibers are then slid into the cylindrical ducts 10, for example with a diameter of the order of 200 µm for 125 µm diameter fibers, over a distance D1, for example of the order of 1 mm. A conical connection 11 guides the fibers as far as the precision holes 12. Therefore with this method of alignment, an intermediate distance D1 is necessary so that the fiber can be inserted into the precision hole 12.

The initial preliminary guidance of the fibers is achieved by the waves 9. The fibers are not inserted into the cylindrical ducts directly, and they can be seen through an opening 13.

This device introduces the risk for the user that he will not be able to insert the fibers in the ducts in which they should be inserted. For example, this is the case of fiber 2b as shown in FIG. 2. A large angle can be achieved by adjustment of the ribbon 8 with width Dr within the recess 14 with width De. A fiber that stops firstly on the recess 14 (fiber 2a) can bend, thus enabling a fiber in this example located opposite the fiber 2a (FIG. 2b) to enter a duct that is not intended for it (duct 10a, whereas the duct that should contain the fiber 2b is duct 10b). This positioning error may make the fiber strip unusable. The only way to avoid this malfunction is extremely good eyesight and tactile skill.

Other solutions are known according to prior art. Thus, the patterns by which fibers can be aligned may be in the form of notches engraved directly in the optical component. An optical fiber built into a notch is then put directly facing a microguide. This type of connection has the advantage that it is not necessary to implement the alignment by coupling of light. However, the size of the notches was not adjusted to the size of the fibers, consequently the alignment of optical axes between the fibers and microguides remains difficult.

U.S. Pat. No. 5,440,657 discloses a splice in which the ribbon is guided by a casing with a structure in which the angle of approach enables fibers to be guided towards the alignment ducts separated by edges. The use of this type of alignment method causes high scrap rates since the natural dispersion of stripped fibers at the output from the ribbon is such that the fibers can slide on the edges that separate the ducts and consequently be directed toward the wrong duct. The only way to get around the problem is if the operator is highly skilled and takes special care. Therefore, this type of alignment device is not suitable for mass production or for wiring that has to be done by the final customer.

The invention does not have these disadvantages.

The invention relates to a structure for separating and prepositioning a set of fibers in which the fibers are inserted so that they can be separated and prepositioned. The structure comprises at least one recess that will contain and preposition a single fiber, the recess comprising a bottom wall, a top wall and at least one side wall formed by the side wall of a first pattern, the pattern having a front edge that is oblique with respect to the bottom wall of the recess and that goes from the bottom wall of the recess as far as a top part of the pattern, the side wall having at least one inclined connecting surface connecting the front oblique edge to the rest of the side wall, the top part of the pattern being at a distance from the top wall at the highest point of the front edge equal to a distance H less than or equal to one fiber diameter.

The recess of each fiber is defined on the sides by two walls. A first wall is formed by a side wall of a first pattern, the other side wall being formed by a side wall of a second pattern adjacent to the first pattern, or by a side wall of the body of the structure.

The walls have been called "top wall" and "bottom wall" simply for clarity of the description, but obviously the structure can be in any position in space; thus, the concepts of "top", "bottom", and even "side" are all relative to an arbitrary reference plan.

Advantageously, the distance H is less than the diameter of the fiber to avoid any risk of bad assembly.

The invention also relates to a device adapted to contain a set of separate fibers prepositioned using a structure according to the invention. The device and the structure form a particularly precise fiber positioning system. For each fiber, the device comprises a guidance zone and a reception notch formed by a narrowing of the guidance area.

In the application for the connection of optical fibers to an optical device, the separation and prepositioning structure according to the invention advantageously enables fixing each optical fiber in a position such that the fibers can easily by aligned with the optical device, regardless of the initial position of the fibers.

Figure 3:
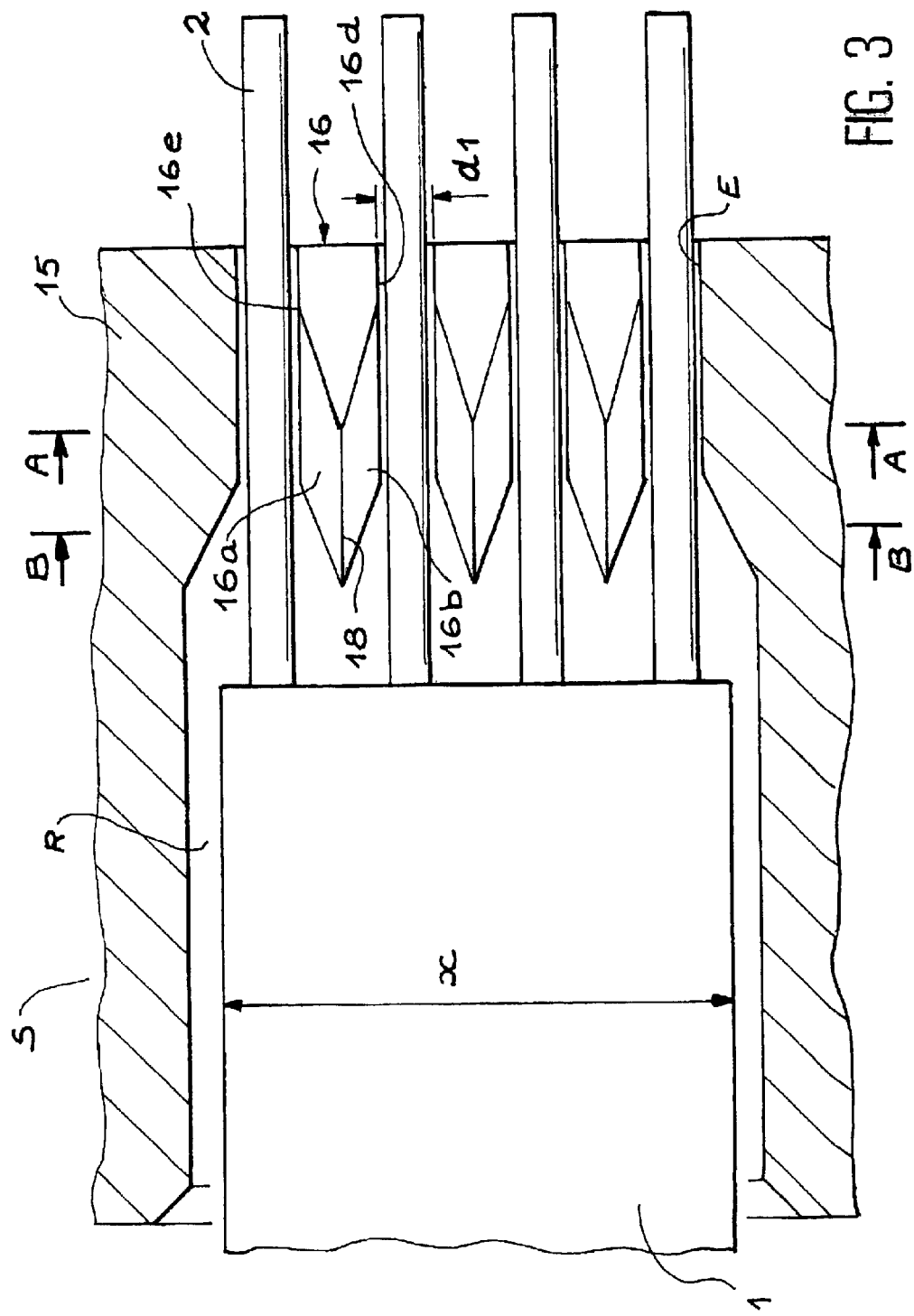
Figure 4A:
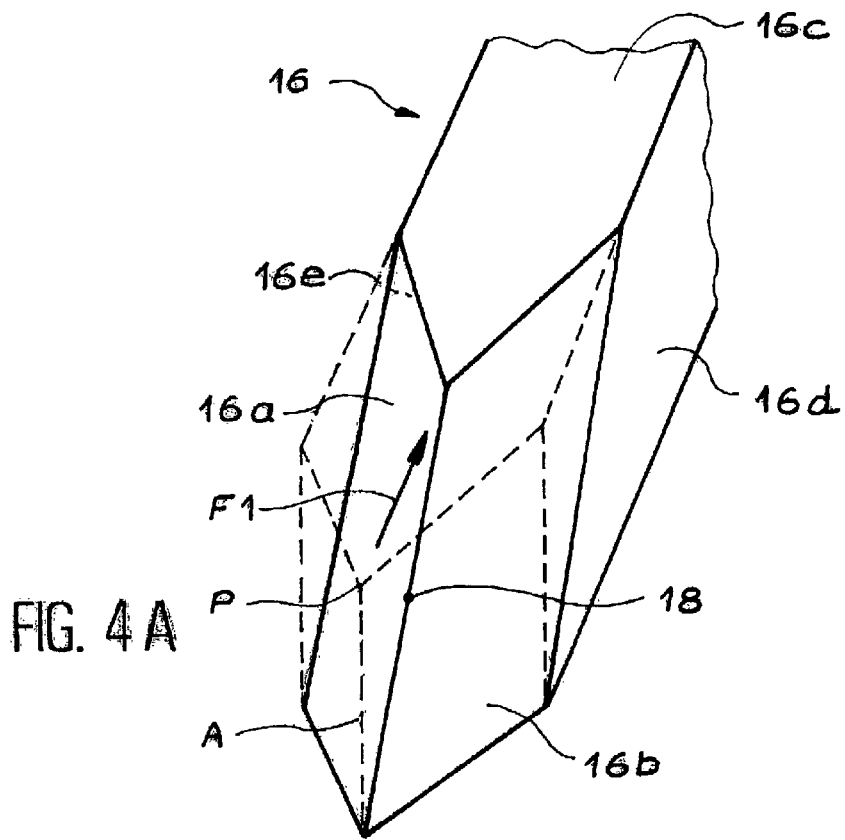
Figure 5:
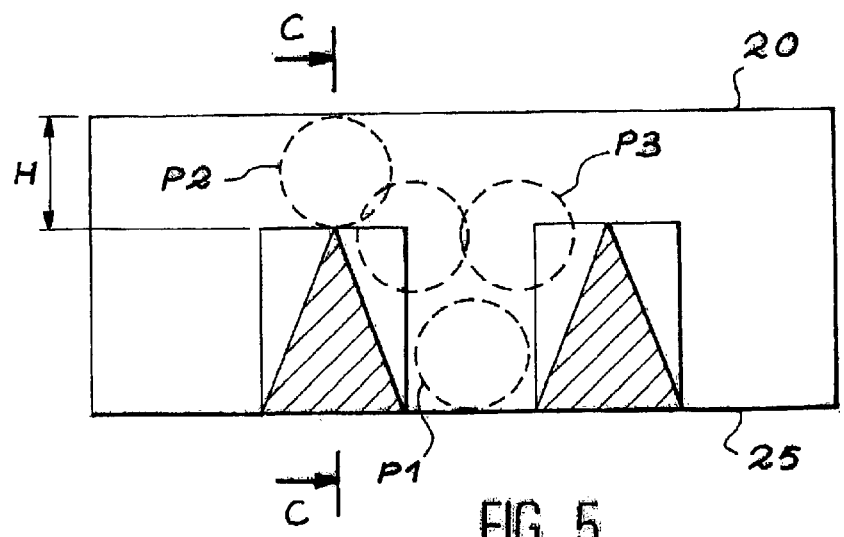
Figure 4B:
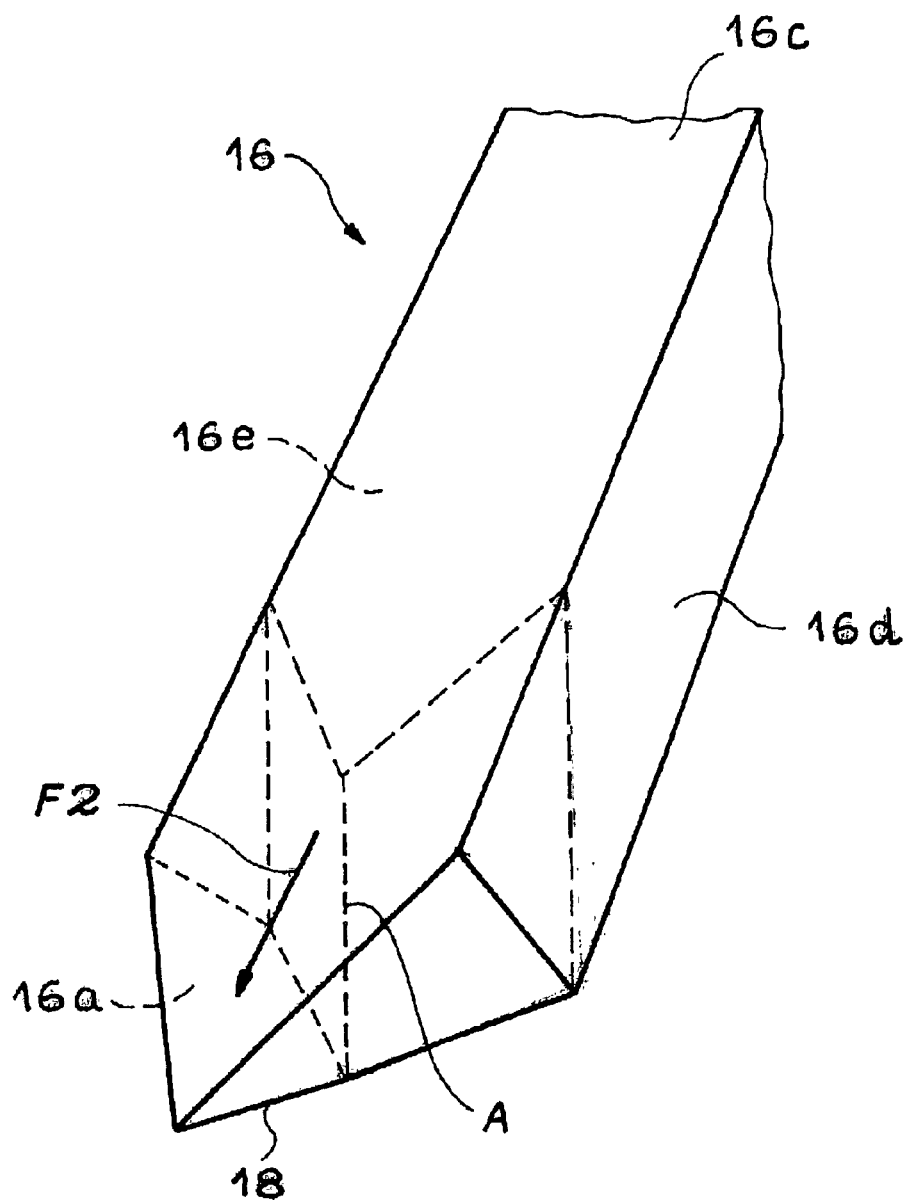
Figure 6:
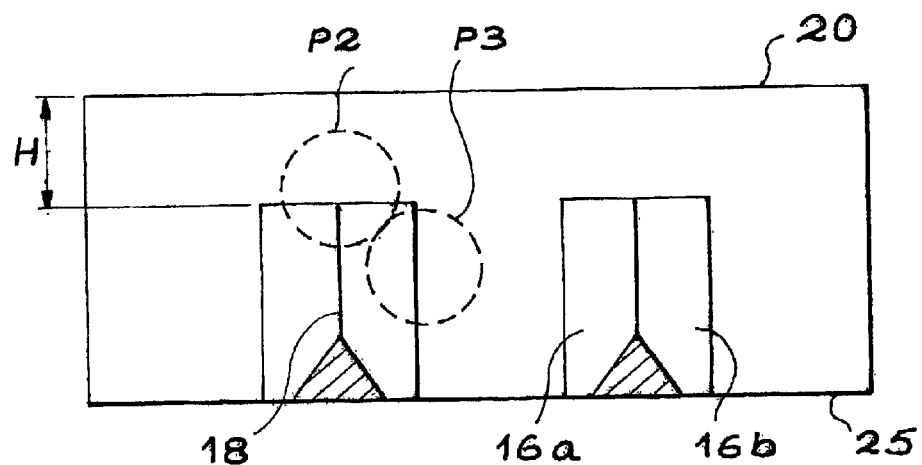
Figure 7:
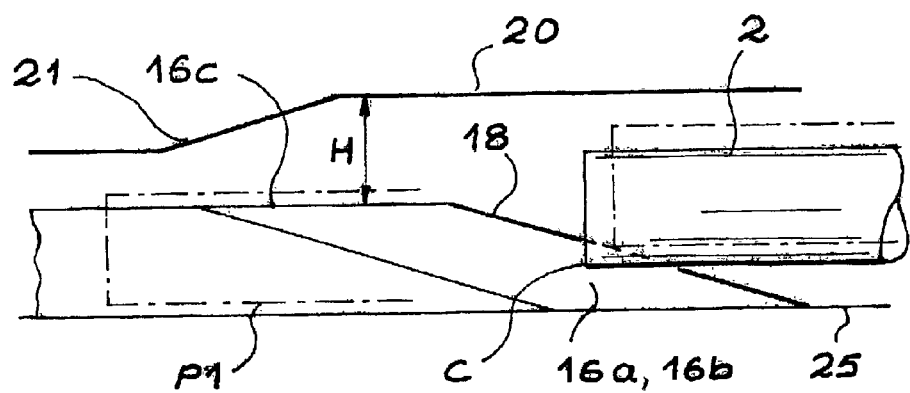
Figure 8:
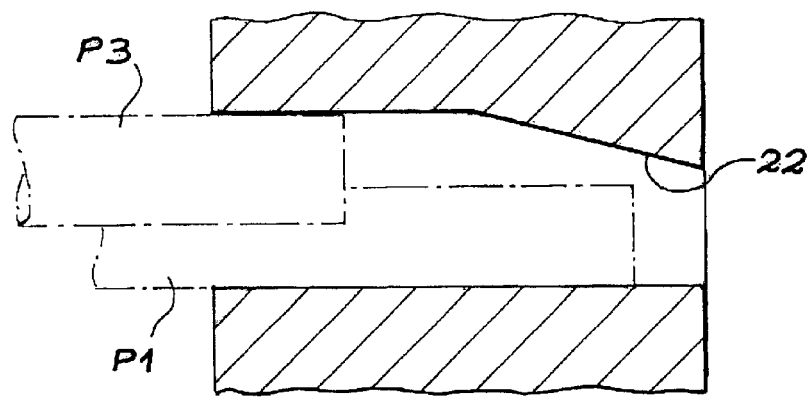
Figure 10:
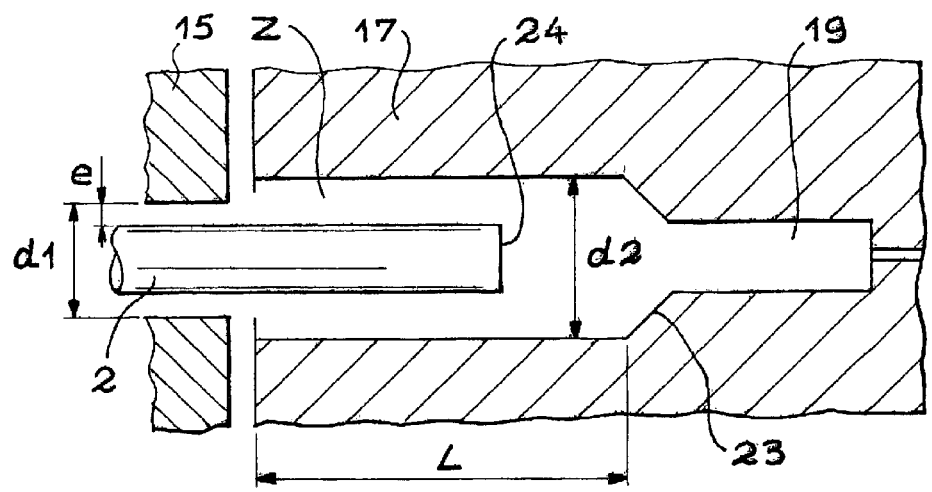
Figure 9:
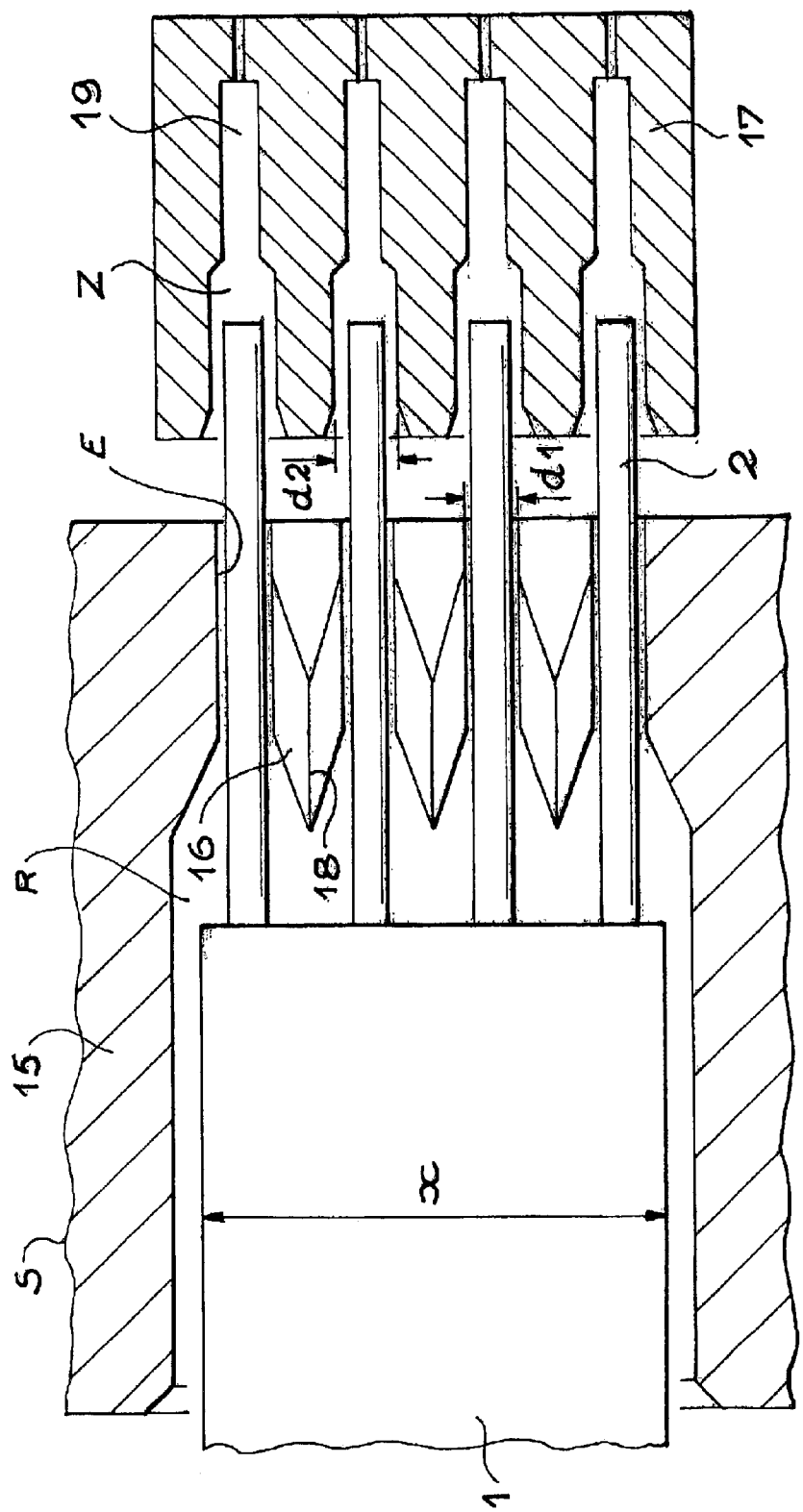
Figure 11:
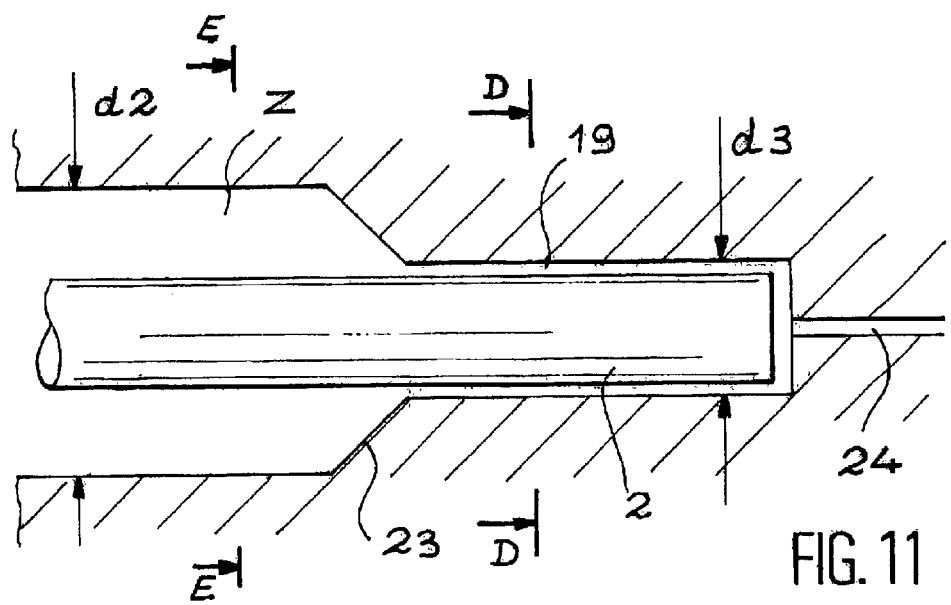
Figure 12:
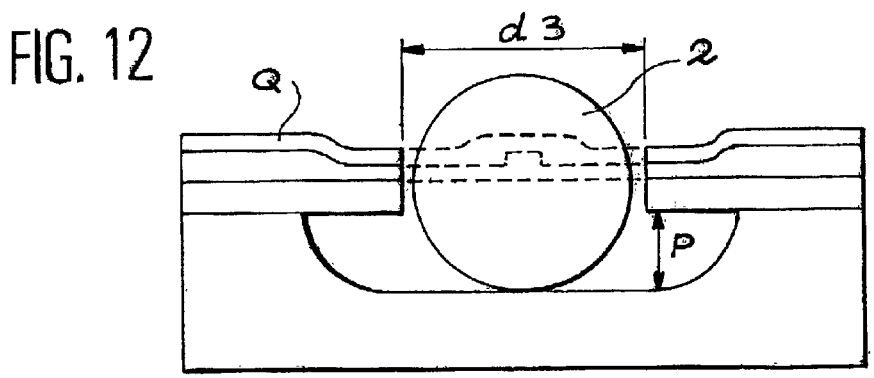
Figure 13:
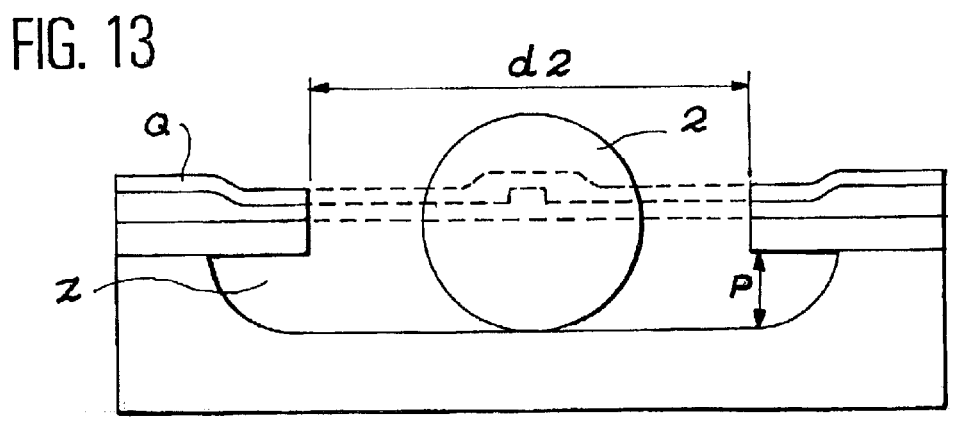

Other advantages and characteristics of the invention will become clear after reading a preferred embodiment of the invention with reference to the attached figures, among which:

FIG. 1 shows a structure for alignment of optical fibers by coupling of light according to prior part, FIG. 2 shows a structure for alignment of optical fibers by mechanical guidance according to prior art, FIG. 3 shows a top view of a structure for separation and prepositioning of fibers according to the preferred embodiment of the invention, FIGS. 4A and 4B each show a perspective view of an example pattern of the separation and prepositioning structure of fibers according to the invention, FIG. 5 shows a first sectional view of the structure according to the invention shown in FIG. 3 (section AA), FIG. 6 shows a second sectional view of the structure according to the invention shown in FIG. 3 (section BB), FIG. 7 shows a sectional view of the structure according to the invention shown in FIG. 5 (section CC), FIG. 8 shows a third sectional view of the structure according to the invention shown in FIG. 3, this section being perpendicular to the top and bottom walls and along the centerline of the fibers, FIG. 9 shows a top view of the structure for separation and prepositioning of the fibers according to the preferred embodiment of the invention associated with the device for collecting separate and prepositioned fibers, FIG. 10 shows a top view of a detail in FIG. 9, FIG. 11 shows a top view of an optical fiber positioned in a device that will contain a set of separate fibers prepositioned using a structure according to the invention, FIG. 12 shows a first view of a section through FIG. 11, (section DD), FIG. 13 shows a second view of a section through FIG. 11, (section EE).

The same marks denote the same elements on all figures.

FIGS. 1 and 2 have been described above, therefore there is no point in describing them again.

The remainder of the description will be made with reference to FIGS. 3 to 13 simultaneously, in order to facilitate understanding of the invention.

FIG. 3 shows a top view of a fiber separation and prepositioning structure according to the preferred embodiment of the invention. A ribbon 1 on which fibers 2 are fixed is positioned in the structure S.

The structure S comprises a body 15 at one end of which a set of patterns 16 are positioned in parallel. Each pattern 16 comprises an edge 18 and two side walls. Each side wall has an inclined connection surface (16a, 16b) connecting the edge 18 to the rest of the side wall (16e, 16d) (see FIGS. 3, 4A, 4B, 6 and 7). The patterns 16 are located on a bottom wall 25 of the structure (see FIGS. 5, 6, 7). The edge 18 is a front edge that is oblique to the bottom wall of the recess and goes from the bottom wall of the recess as far as a top part 16c of the pattern.

The front edge 18 may be inclined backwards or forwards. A "backwards" inclination means that the front edge goes from the bottom wall of the recess towards the top part of the pattern along the direction in which the fibers are inserted (see FIGS. 4A and 7). Similarly, "forwards" inclination means that the front edge goes from the bottom wall of the recess towards the top part of the pattern along the direction opposite to the direction in which the fibers are inserted (FIG. 4B).

According to the embodiment shown in all figures, the top part 16C has a plane surface approximately parallel to the bottom wall 25. In other embodiments of the invention, the top part 16c is not plane and is not parallel to the bottom wall 25.

FIGS. 4A and 4B facilitate understanding of the geometry of a pattern 16 according to the invention. FIG. 4A shows the embodiment by which the edge 18 is inclined "backwards" and FIG. 4B shows the embodiment according to which the edge 18 is inclined "forwards" (see above).

The geometry shown in dashed lines shows a parallelepiped on which the front beveled part defines a vertical edge A. The geometry shown in solid lines represents a pattern 16 comprising two side walls (16a, 16e and 16b, 16d respectively), the top part 16c and the front edge 18.

The intersection between the edge A and the plane defined by the top part 16c is a point P. In order to build the representation of a pattern 16 starting from the dashed lines geometry for which the edge is inclined "backwards" (FIG. 4A), all that is necessary is to move point P towards the back of the figure along the plane defined by the top part 16c and along the direction of the arrow F1 which is the direction in which fibers will be inserted in the structure according to the invention. Similarly, to create the representation of a pattern 16 for which the edge is inclined "forwards" (FIG. 4B), the point P is moved towards the front of the figure along the plane defined by the top part 16c and along the direction of the arrow F2 which is the inverse direction of the direction in which the fibers are inserted in the structure according to the invention.

According to the preferred embodiment of the invention, a side face of the pattern 16 comprises a single inclined connection surface (16a, 16b) between the inclined front edge 18 and the rest of the side wall (16e, 16d). More generally, the invention relates to a pattern 16 in which a side face comprises at least one inclined connection surface between the inclined front edge 18 and the rest of the side wall.

The patterns 16 have a pitch and a geometry such that two consecutive patterns define a recess in which a fiber can be inserted, together with the bottom wall 25 and the top wall or a cover 20 (see FIGS. 5, 6 and 7). When prepositioning, any fiber 2 that comes into contact on one of the inclined connection surfaces 16a, 16b at a given point C (see FIG. 7) is naturally oriented towards its ideal position P (see FIGS. 5 and 7). According to the invention, it is possible to separate fibers offset from their nominal position by a value equal to half of the pitch of the patterns 16 plus the radius of the fiber, without blocking them. This separation without blocking is due to the presence of the inclined edge 18 (see FIGS. 1, 4 and 7) and the cover 20 that force an offset fiber into an extreme position (position P2 in FIGS. 5 and 6) to the required position P1 (see FIGS. 5 and 7). The inclined edge 18 of the pattern 16 is not more than a distance H from the cover 20 (see FIGS. 5, 6 and 7). The distance H is less than or equal to (preferably less than) the diameter of the fiber. Inclination of the cover 20 contributes to putting the fiber into the ideal position P1 that it should occupy (see FIG. 7). The prepositioning function follows the separation function described above. The purpose of the prepositioning function is to bring the eccentric fibers (see positions P2 and P3 in FIG. 6) towards the central position P1.

A fiber 2 prepositioned in the device according to the invention remains free to move along its axis with a side clearance e (see FIG. 10) that enables it to be guided in a precision notch 19 (see FIGS. 9 and 10) located in a device 17 (see FIGS. 9 and 10), for example an optical device in which it will fit.

The width d1 that separates two successive patterns 16 must be included within the width d2 of a guidance area Z of the device 17 in which the fibers will be fitted (see FIGS. 9 and 10). Preferably, the guidance area Z is made during the operation during which the precision notch 19 that extends it is produced. The inclination 21 of the cover 20 enables the fiber (see FIG. 10) to easily penetrate into the zone Z. Once the fiber has been introduced into zone Z, the fiber is guided in the notch 19 by a narrowing 23 of the zone Z. If the optical fibers are positioned facing the optical guides, the invention advantageously enables almost perfect alignment of each optical fiber with an optical guide.

As already mentioned, the fibers 2 are usually inserted in a ribbon 1. The structure on the input side of the fiber positioning recesses comprises a groove R to guide the ribbon 1.

The structure according to the invention has the advantage that it separates fibers from each other optimally, but without preventing them from moving. A fiber remains mobile about its axis with a slight side clearance e that enables it to be guided without stress in a notch 19. During this prepositioning operation, the fibers are not affected by aggressive shocks on the edges of their face, thus preventing tearing. Several insertions of the same fiber block are then possible.

As mentioned above, the subject of the invention is particularly advantageous for making a complete device for reliable coupling of optical fibers to an integrated optical circuit combining the micro-machining precisions characteristic of the substrate (a few tenths of a micron) with the precisions achieved with low cost processes such as plastic injection molding (tolerances from 5 to 30 microns).

The device for coupling an optical fiber ribbon to an integrated optical circuit then has the characteristics mentioned below.

A zone Z that will contain a fiber advantageously has a U-shaped prismatic cross section (obviously other shapes can be used) as shown in FIG. 13 (FIG. 13 is a view along section EE in FIG. 11). The bottom of the notch 19 is preferably at the same depth P as the zone Z and also has a U-shaped prismatic section. The notch 19 is made by a narrowing of the upper part of zone Z (FIG. 12). For example, narrowing can be made using layers Q arranged on a substrate in which the bottom of the U is formed (see FIG. 12). Zone Z and the bottom of the notch 19 are preferably made from the same substrate (single or multilayer) to reduce friction when the fiber passes through.

Microguides and notches are made by similar etching processes, with masks positioned on the same mark, the relative position tolerance of one notch with respect to the microguide being a few tenths of a micron. For an optical fiber with a diameter equal to 125 $\mu$m, for example, the width d3 of the notch 19 is typically between 125.5 $\mu$m and 127 $\mu$m (depending on the required positioning precision). In order to achieve an angular alignment error less than 0.25 degrees, the length of the notch 19 must be equal to about 115 $\mu$m and 460 $\mu$m respectively. The wall between the notches 19 may be thin. It is then possible to make preguid-ance zones Z with width d2 (see FIG. 12) that, for example, will be approximately between 150 $\mu$m and 200 $\mu$m.

Inserting a fiber into a zone Z forces the fiber to center itself in the zone, and then to slide firstly to the bottom of the preguidance zone Z, and then to the bottom of the notch 19. The length of the preguidance zone Z defines the deformations and therefore the maximum constraints applied to the fiber by aligning itself. Consequently, the distance separating the input to zone Z from notch 19 is L such that:

$$L \geq \frac{\partial}{2}\sqrt{R_{\min} \times \Delta U},$$

where $R_{min}$ is a minimum radius of curvature induced on the fiber chosen so as not to embrittle the fiber and $\Delta U$ is the difference between the width d2 of the preguidance zone Z and the width d3 of the notch 19. In practice, an impact point of the fiber located between 800 $\mu$m and 3 mm from the end of the guidance zone satisfies the constraints mentioned above.

The final guidance along the centerline of the fibers is made by pushing the fibers facing the substrate and forcing them into contact with the bottom of the notches. The space between the fiber and the optical guide may be filled with an index adaptation gel. The fibers can be brought into contact with the bottom of the notches by elastomer pads. More generally, the connection according to the invention is easily removable and reinsertable. The connection may also be permanent. It is then possible to permanently glue the fibers onto the substrate. Furthermore, the ribbon 1 may be fixed to the structure 15 by a mechanical blocking part, for example along the ribbon guidance groove R. For example, this blocking part may be an elastomer pad held on the structure (S) under pressure.

What is claimed is:

1. Structure for separating and prepositioning a set of fibers in which the fibers are inserted to be separated and prepositioned, comprising:

at least a recess to contain and preposition a single fiber of the set of fibers, the recess comprising a bottom wall, a top wall, and at least one side wall formed by a side wall of a first pattern, the first pattern including an oblique front edge oblique from the top wall of the recess and extending from the bottom wall of the recess as far as a top part of the pattern, the at least one side wall having at least one inclined connection surface connecting the oblique front edge to a rest of the side wall, the top part of the pattern being at a distance from the top wall at a highest point of the oblique front edge, equal to a distance less than or equal to one fiber diameter.

2. Structure according to claim 1, wherein the at least one side wall of the recess is formed by a side wall of a second pattern close to the first pattern.

3. Structure according to claim 1, wherein the at least one side wall of the recess is formed by a side wall of a body of the structure.

4. Structure according to claim 1, wherein the top part of the pattern is approximately parallel to the bottom wall.

5. Structure according to claim 1, wherein the top part of the pattern is not planar.

6. Structure according to claim 1, wherein the top wall has an inclination that brings the top wall towards the top part of the pattern to reenter the fiber along a predefined axis.

7. Structure according to claim 1, wherein the top wall covers at least all of the top part of the pattern.

8. Structure according to claim 1, further comprising a groove on an input side of the recess to guide a ribbon on which the fibers are inserted.

9. Structure according to claim 8, further comprising a mechanical blocking part along the groove to fix the ribbon.

10. Structure according to claim 1, wherein the structure is an optical fiber separation and prepositioning structure.

11. Device configured to contain a set of separate fibers prepositioned using a structure according to claim 1, comprising for each fiber a guidance area and a reception notch for the respective fiber formed by a narrowing of a guidance zone, the device and the structure forming a positioning system.

12. Device according to claim 11, wherein at least one of the guidance zone and the reception notch comprises a U-shaped prismatic section.

13. Device according to claim 11, wherein a length L of each guidance zone is such that:

$$L \geq \frac{\partial}{2}\sqrt{R_{min} \times \Delta U},$$

where $R_{min}$ is a minimum radius of curvature chosen to not embrittle the fiber and $\Delta U$ is a difference between a width of the guidance zone and a width of the reception notch.

14. Device according to claim 13, wherein the length L is between 0.8 mm and 3 mm.

15. Device according to claim 13, wherein the width of a guidance zone is approximately between 150 μm and 200 μm.

16. Device according to claim 13, wherein the width of the notch is approximately between 125.5 μm and 127 μm when the diameter of the fiber is approximately equal to 125 μm.

17. Device according to any one of claim 11, wherein a width of a guidance zone is greater than a width that separates two successive patterns of the structure.

18. Device according to claim 11, wherein the device is an optical device comprising at least one microguide.

* * * * *